June 23, 1925.  1,543,324
A. J. DE RAEVE
PROCESS FOR TREATING TRADE WASTE WATERS TO CLARIFY AND STERILIZE THE SAME AND TO EXTRACT FATS THEREFROM
Filed March 20, 1922   2 Sheets-Sheet 1
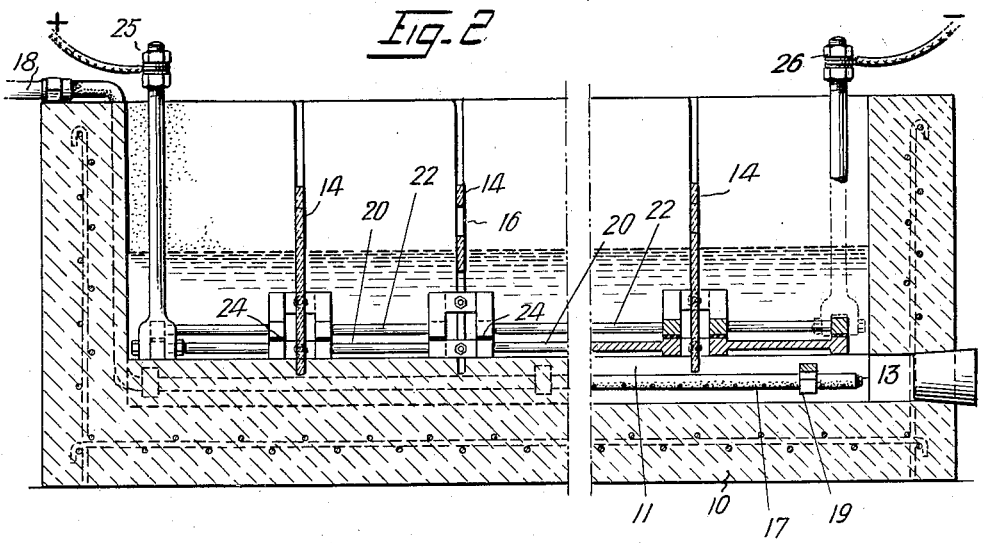
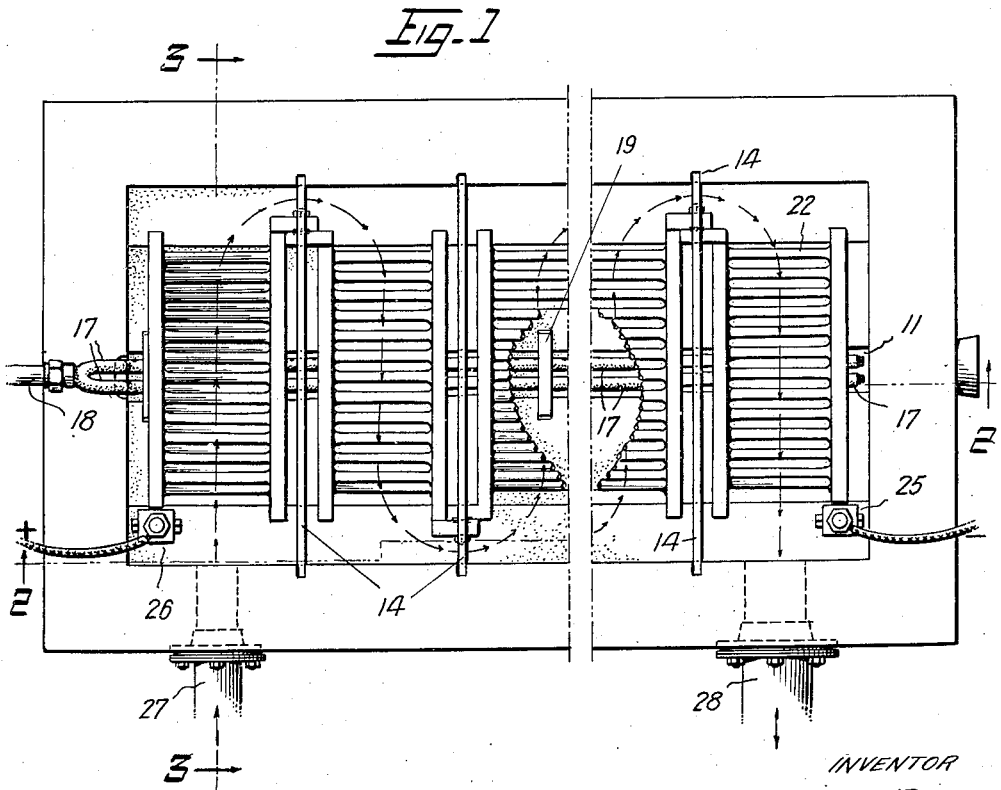
INVENTOR
Adhémar Jean de Raeve
BY *Richards & Grier*
ATTORNEYS.

June 23, 1925. 1,543,324
A. J. DE RAEVE
PROCESS FOR TREATING TRADE WASTE WATERS TO CLARIFY AND STERILIZE THE
SAME AND TO EXTRACT FATS THEREFROM
Filed March 20, 1922 2 Sheets-Sheet 2
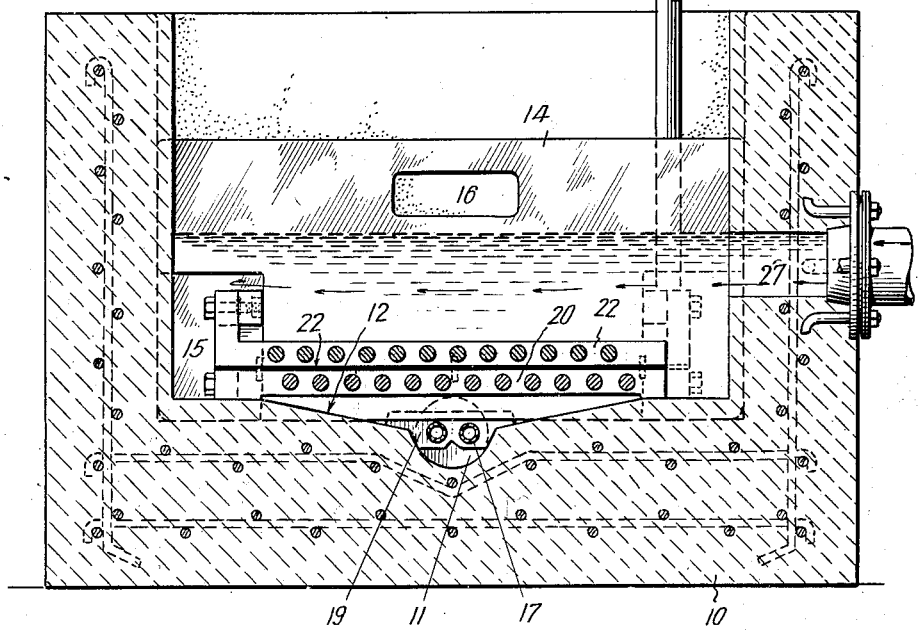
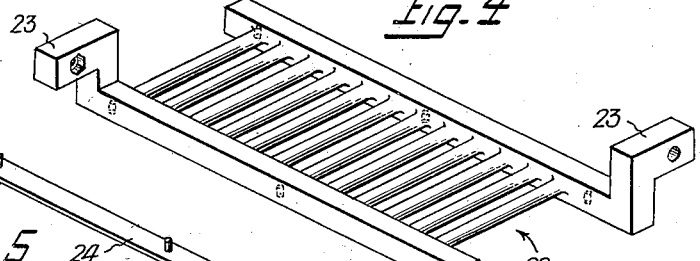
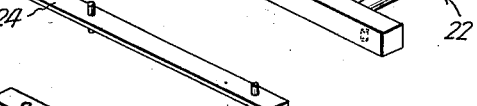
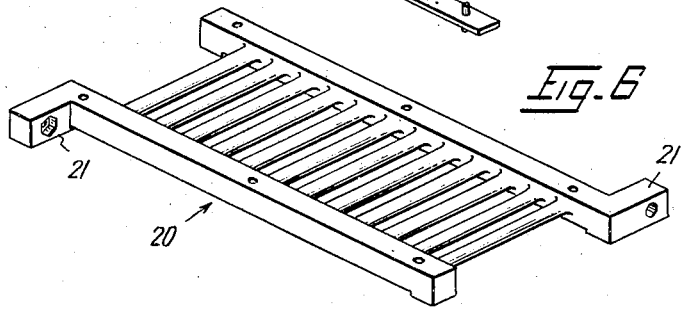
INVENTOR
Adhémar Jean de Raeve
BY
ATTORNEYS.

Patented June 23, 1925.

1,543,324

UNITED STATES PATENT OFFICE.

ADHÉMAR JEAN DE RAEVE, OF SYDNEY, NEW SOUTH WALES, AUSTRALIA.

PROCESS FOR TREATING TRADE WASTE WATERS TO CLARIFY AND STERILIZE THE SAME AND TO EXTRACT FATS THEREFROM.

Application filed March 20, 1922. Serial No. 545,393.

*To all whom it may concern:*

Be it known that I, ADHÉMAR JEAN DE RAEVE, a subject of the King of Great Britain and Ireland, and residing at Sydney, New South Wales, Australia, have invented certain new and useful Improvements in Processes for Treating Trade Waste Waters to Clarify and Sterilize the Same and to Extract Fats Therefrom, of which the following is a specification.

The primary object of this invention is to effect the extraction of grease in a clean condition from wool wash suds, and simultaneously, to render effluent waters sufficiently clear, acid free, and non-odorous to be run as waste into sewers or open watercourses. The invention is applicable for the treatment of trade waste waters, other than wool suds, containing protein matter.

The invention is hereinafter described in detail for the treatment of wool wash suds, which, in addition to wax obtained from the wool, contain carbonate of soda and saponified oil of the soap stock used in the washing process. These suds also contain dried sweat (suint) excrementitious and urinous elements, and promiscuous dirt, with which the wool was fouled. They are liable in the untreated condition to rapid fermentation, and, as is well known, when they are run to waste they become an immediate nuisance.

The present invention, in addition to providing for the extraction of grease, provides also an effective means for clarifying trade waste waters containing protein matter, and for precipitating mud and mineral matters therefrom. The process should be carried out according to exact methods, and should, therefore, be under competent control. Reckless methods of operation will not ensure entirely satisfactory results.

The persistently emulsified condition of wool scour suds and their resistance to resolution results from the presence therein of gelatinous elements (meta proteins, alkali albumins, nitrogenous colloids, and amiens) which result from hydrolysis of native protein matter (albumins and albuminoids) by action of the washing soda which is used in the scour. These products are protective colloids which entangle and hold the grease, so that it resists separation. Acidulation of wool wash liquors to neutralize them with the object of releasing grease, results in coagulation of only some of the contained grease mixed with mineral suspensoids. To procure more separation, excess acid has usually been added, a black viscous magma being thus obtained which settles and is subsequently treated for the recovery of a product which is known in the trade as Wakefield Black Oil.

Wool grease obtained by my process is a clear product which has a settling point about 42° C; its color varies, according to the origin of the wool, from pale yellow to "stone" color.

In carrying out my process, in order to ensure the best results, the suds or scour liquors should not suffer fermentation before treatment is begun. Consequently, the practice of reserving soapy waters overnight for re-use and refreshing them with detergents next day should not be followed. The suds or scour liquors resulting from each day's washing operations are sent for treatment immediately, and each day's work commenced with fresh wash liquor. The augmented value of the grease recovered, apart from considerations relating to the clarification of the effluents, will adequately compensate for the abandonment of the wash liquors for scouring purposes at the end of each day's work. If the suds be allowed to cool and rest, a change in their composition occurs due to fermentation in which acetic and propionic acids are produced. Fermentation begins immediately the temperature drops substantially below the working average of the wool wash, which is ordinarily about 48° C. It is not disadvantageous to mix all the suds from a works together, including those from slipe wool. Where there is a substantial quantity of lamb's wool or clean merino wool in the wash, the liquors therefrom may be treated separately, as the grease obtained will in that case be finer in quality than the average.

In practising the process, two vats are used, each having ample capacity to carry one day's charge of suds. In order to avoid the necessity of transferring liquors by pumping, these vats are disposed in descending order, so that the liquor from No. 1 may be run into No. 2 vat by gravitation. Each of the vats is formed with a sump bottom to facilitate the removal of sludge deposited therein.

To procure precipitation of mineral and insoluble organic suspensoids in the first vat, the carbonate of soda contained in the suds is converted into caustic soda, and the suds then boiled. In the second vat the liquor is chlorinated. Immediately afterwards the alkali hypochlorites are neutralized by acid to form weak hypochlorous acid which dissociates into hydrochloric acid and oxygen. The hydrochloric acid attacks all available alkali substances, and the nascent oxygen oxidizes organic substances present.

The detail of the process is as follows:—

When the suds are brought to the first vat from the wash bowls, fresh milk of lime is added, and they are then heated by means of live steam and brought to boiling point for a period of five minutes or longer. The carbonate of soda in the liquor is converted into caustic soda by reaction with the lime. To effect this conversion, lime is used in equivalent quantity to react with the quantum of carbonate of soda found by titration. The lime is broken and slaked in cold water and the resulting lime milk is intermixed with the suds by agitation. The agitation may be effected by means of air blasts, but by whatever method the agitation be effected, it should be assured that the lime is well distributed throughout the liquor. In its reaction with the carbonate of soda the lime loses its hydroxyl, and calcium carbonate is produced, which functions as a coagulant. It brings down with it insoluble organic matter and fine mineral matter and also lime soaps produced by reaction of the lime with the soluble soaps used in the wool washing operation.

After liming and boiling, the contents of the vat are left undisturbed until next day to cool and settle. The boiling of the liquor results in reduction of its viscosity and facilitates sedimentation and causes expulsion of free ammonia.

After resting sufficiently long to procure satisfactory sedimentation and cooling off, the liquor is transferred from the first vat into the second vat, the precipitated sludge being left in the first vat sump, whence it is subsequently removed and used for its manurial value. Cooling may be expedited by introducing fresh cold water, thereby also thinning the mass and so facilitating the future steps; or by refrigeration or by exposure to the atmosphere in streams or films. The total alkali radical contained in the liquor is now ascertained by titration of a sample, and chlorine gas is supplied in quantity sufficient to react with the alkali to produce chloride and hypochlorite, allowing, however, an excess of alkali radical to the extent of about one half gramme per litre.

The reaction of chlorine on caustic soda for example, so long as the caustic soda is in excess of the combining equivalent and the temperature is kept normal or low (below 35° C), produces hypochlorite of soda and common salt. Fumes of any ammonium chloride produced are permitted to blow away to waste. The sodium hypochlorite acts on the hydrolysed proteins (meta-proteins) and produces chloro-proteins.

During the introduction of chlorine, a quantity of grease is liberated and floats. A temperature not above 35° C, and preferably about 27° C, should be maintained at this stage of the process. The action of chlorine on proteins is most effective in cold conditions. Where owing to climatic conditions, the temperature of the liquor is not below 35° C, the liquor may be artificially cooled to bring it below that point.

The chlorinating operation occupies about half an hour. Chlorine may be liberated into the second vat by electrolytic action. In this case sodium chloride is added to the liquors in the first vat in quantity sufficient to produce the necessary quantity of chlorine when the liquors are submitted to electrolysis in the second vat. After chlorination, the liquors are pale yellow in color and substantially clean, but they still retain some of the original mineral suspensoids. They are at once titrated to ascertain their content of alkali hypochlorite, and an equivalent quantity of acid to effect neutralisation is then added. The acid is diluted in water and intermixed through the liquor by agitation by means of air blasts. During acidification, violent reaction takes place due to the setting free of hydrochloric acid and oxygen, grease and soap contained in the liquor are separated rapidly and float, and some gas passes off. The float grease and soap are removed by skimming. If the residual liquor should be found to be not sufficiently clear, a little more diluted acid is added to improve clarification. If, at the finish of the operation, the liquor shows acid on litmus test, milk of lime is added to neutralise it and to cause precipitation of fixed solids. The liquor may be further clarified by running it through a filter bed of clinker and sawdust or like inert material. Very little dirt will be found in the second vat, and the grease which is separated in it will be found to be granulated and contain a small proportion of fibrous matter consisting of inert chloro-proteins which were contained in the liquor. Sulphuric acid is ordinarily used for the acid reaction, but hydrochloric acid may be used.

The proportion of the total contained grease recovered is upwards of 90% and usually is of the order of 96%, the difference being represented principally by the free fatty acids of the soluble soaps which are precipitated as lime soaps in the sludge. The final effluent contains a practically negligible proportion of greasy matter, is slightly tinted, but is not prone to decomposition.

The dehydration of the recovered grease, which contains some entrapped acidulated water, is effected according to a known method, which consists in re-emulsifying it with clear water in which some carbonate of soda has been dissolved, in a vat heated by means of a steam coil or steam jacket and fitted with a stirrer, or by boiling up in a digester and settling out. The soda carbonate reacts with any alkali bi-sulphates present and with any sulphuric acid contained in the water which is carried over with the grease and also with organic acids therein.

The extracted grease is set in a hot jacket pan, where the products of several days' run may be pooled and intermixed, thereby to obtain a final product of average uniform color and texture. Water held in suspension in the grease will separate out slowly when the grease is kept standing for several days in a quiet condition at a temperature slightly above its melting point.

Dehydration might be accomplished according to the known method which consists in setting the grease in a bath of sulphuric acid in order that the acid may absorb water from it. Though water is abstracted by this means, the grease is thereby tainted and this method is therefore objectionable.

The extraction of fats and greases from abattoirs' waters and other greasy waste waters is effected in substantially the same manner as described already in relation to the treatment of wool wash suds. These waters are usually received in a warm condition. For their resolution a rough estimate is made to determine the saponifiable organic contents, and an equivalent quantity of caustic alkali—preferably caustic soda—is at once added and agitated in the liquor, and if the chlorination is to be effected by electrolytic means the required quantity of sodium chloride is added with the caustic alkali. Boiling to facilitate sedimentation is optional in this case but is desirable for the purpose of expelling free ammonia. The waters are then left for twelve hours or longer for cooling and sedimentation. When the temperature is below 35° C, and preferably about 27° C, the supernatant liquor is transferred to another vat, and an equivalent of chorine is introduced into or liberated in the liquor by electrolysis and agitated by air pressure or otherwise. The liquor is then acidified as already described to neutralise the alkali hypochlorites and effect consequent liberation of the fat and grease. The floated fat and grease are skimmed off, and the effluent liquors are neutralised, if desired; they are not prone to decomposition. The precipitated matter obtained in the first stage of the treatment is removed and worked up with clay or loam and used for its manurial value.

For effecting clarification of trade waste waters containing proteins but no grease, or negligible quantities of grease, milk of lime is added in sufficient quantity to react with the proteins. The proportion necessary is only that which is essential for procuring these reactions, but as in practice it would be inconvenient to be obliged to determine the quantities of proteins present, and as the cost of lime is low and the presence of an excess of lime is not objectionable, the lime is proportioned to the total quantity of organic matter in the liquor; this quantity may be readily determined by a laboratory sample test. In practice, to ensure a sufficiency for the desired reactions, 1 lb. of lime is added for every 10 lbs. of organic matter estimated by laboratory sample test. The protein compounds which are produced in the reaction of the caustic alkali with the native proteins precipitate as a sludge. The supernatant liquor which contains the putrefiable gelatinous colloids as alkali-albumins or meta-proteins is transferred to another vat, and chlorine is introduced into or liberated in it as before described, sodium chloride being added in the case where electrolytic liberation of chlorine is practised. Care is taken to have the solution cool (about 27° C. if practicable) so that chlorine will not be given off and cause a nuisance and discomfort of the operators. After chlorination, the chlorinated liquor is neutralised with just sufficient acid to neutralise the alkali hypochlorites. The waters are set to repose for about eight hours before they are directly released to waste, or sent to waste through a clinker and sawdust filter, any acidity being neutralised beforehand with milk of lime.

Fig. 1 of the accompanying drawings is a top plan view of an electrolytic cell designed for use in operating the process;

Fig. 2 is a longitudinal section;

Fig. 3 is a transverse section through same;

Figs. 4 and 6 are perspective views of the negative and positive elements of the cell; and Fig. 5 is a perspective view of an insulating separator.

The cell body 10 is constructed of reinforced concrete with a central sump gutter 11 on its shelving floor 12 and a mud hole 13 at one end for flushing out purposes. The cell is subdivided into compartments or sub-cells by glass plates 14 having gaps 15 cut in alternately opposite lower corners so that flow of liquid through the cells will be disposed sinuously as indicated by arrows in Fig. 1. The plates 14 are supported at their side and bottom edges in grooves formed in the cell body. 16 are hand holes in the plates 14 to facilitate handling.

17, 17 are lead pipes connected to an air pressure service pipe 18. These pipes 17 are perforated on their undersides and are supported on bridge blocks 19 which straddle the gutter 11.

The anode elements (Fig. 6) are carbon grids 20 with integral terminal lugs 21 at alternate corners. The cathode elements (Fig. 4) are similar carbon grids 22 having their terminal lugs 23 cranked. The anodes are set below the cathodes with the vulcanite or rubber or wood insulating separators 24 inserted between them. The several anode and cathode grids are respectively connected together by lead bolts, a compression washer of soft lead being set in each joint face to ensure conductivity. The anodes are connected to the terminal post 25 and the cathodes to the terminal post 26. These terminals are respectively connected to a source of direct electric current having a pressure of 3–4 volts and heavy amperage dependent on the capacity of the cell. An amperage of approximately 1,000 to 1,500 per square metre of electrode surface should be available. 27 is the inflow vent and 28 the outflow vent for the liquor undergoing treatment.

In operation, the salted liquor is flowed continuously in through the vent 27 and out through the vent 28, so that it goes successively through every compartment of the cell with sufficient turbulence to ensure intermixing. As it passes over the elements it suffers change in certain of its elements by electrolytic action and by reaction with the products of electrolysis, some percipitation occuring. The effluent is substantially clear. The air jets emitted from the pipes 17 maintain agitation in the flowing stream and promote the reactions upon which clarification depends.

What I claim as my invention and desire to secure by Letters Patent is:—

1. A process for clarifying trade waste water containing protine matter which consists in treating the same with alkali proportioned to the contained quantity of proteins to procure reaction with the proteins, thereafter treating the same with chlorine under moderate or low temperature conditions in proportion to the equivalent necessary for reaction with the contained alkali, and finally adding acid within the combining equivalent quantity of the alkali hypochlorites formed.

2. A process for clarifying fresh trade waste waters containing greasy and protein matter and for extracting grease therefrom, which consists in treating the same with a quantum of caustic alkali equivalent to the saponification value of the contained organic matter, settling the sludge from the liquor, treating the liquor with chlorine under moderate or low temperature conditions in proportion to the combining equivalent of alkali contained therein to produce chloro-proteins, and alkali hypochlorites neutralising the alkali hypochlorites by acidifying the liquor, and skimming off the floated grease.

3. A process for treating wool scour waters, consisting in introducing lime in quantity sufficient to convert the carbonate of soda in said waters into caustic soda and to precipitate calcium carbonate, heating the mass to the boiling point whilst fresh, separating the sludge from the liquor, treating the liquor at a temperature below 35° C. with chlorine in proportion to the combining equivalent of the alkali present, thereby to produce chloro-proteins and alkali hypochlorites acidifying the liquor to neutralise the alkali hypochlorites, and removing the floated fats.

4. In the process defined in claim 3, promoting clarification of the liquor after acidification by the addition of a slight excess of acid to assure the completion of the reaction.

5. In a process of treating liquors containing organic matter to procure clarification thereof, caustic-alkalising said liquors so that the proportion of caustic alkali is in the saponifying equivalent for the organic matter therein, sedimenting, treating the liquor with chlorine under moderate or cool temperature conditions in proportion to the combining equivalent of the alkali present, producing alkali hypochlorites and finally acidifying to neutralise the alkali hypochlorites.

6. A process of treating wool scour suds, which consists in causticising the contained carbonate of soda and heating the suds to boiling point whilst fresh, chlorinating under moderate or low temperature conditions, producing alkali hypochlorites and finally neutralising the alkali hypochlorites by acidification to release the grease.

7. The herein described process of clarifying fresh wool wash liquors, which consists in that said liquors on being causticised are boiled, cooled, and thereafter chlorinated to produce chloro-proteins and alkali hypochlorites therein, and are finally acidified to neutralise the alkali hypochlorites and to separate the grease.

8. A process for clarifying trade waste waters containing protein matter, which consists in adding lime thereto proportioned in the order of about ten per centum to the contained organic matter, separating the precipitated sludge, treating with chlorine under moderate or cool temperature conditions in proportion to the combining equivalent with the alkali present, producing alkali hypochlorites neutralising by acid the alkali hypochlorites, and finally resting the waters before releasing them.

In testimony whereof I affix my signature.

ADHÉMAR JEAN DE RAEVE.